United States Patent [19]
Kauffman

[11] 3,749,876
[45] July 31, 1973

[54] REGULATOR FOR AN EDM POWER SUPPLY

[75] Inventor: Harry D. Kauffman, Cincinnati, Ohio

[73] Assignee: Cincinnati Malacron Inc., Cincinnati, Ohio

[22] Filed: Apr. 24, 1972

[21] Appl. No.: 247,190

[52] U.S. Cl............................. 219/69 C, 307/116
[51] Int. Cl............................................. B23p 1/08
[58] Field of Search............... 219/69 C, 69 P, 69 S, 219/137; 323/21; 307/116

[56] References Cited
UNITED STATES PATENTS

| | | | |
|---|---|---|---|
| 3,485,987 | 12/1969 | Porterfield | 219/69 P |
| 3,539,755 | 11/1970 | Inoue | 219/69 P |
| 3,539,892 | 11/1970 | Lindberg | 323/21 X |
| 3,548,290 | 12/1970 | Swinhart | 323/21 X |
| 3,588,465 | 6/1971 | Anderson | 219/137 |

FOREIGN PATENTS OR APPLICATIONS

| | | | |
|---|---|---|---|
| 46/12514 | 2/1967 | Japan | 219/69 P |

Primary Examiner—R. F. Staubly
Attorney—Howard T. Keiser et al.

[57] ABSTRACT

In an EDM power supply, an apparatus is provided for maintaining an approximately constant energy level in electrical discharges generated across a machining gap in response to variations in the line or input voltage. Upon detecting changes in the input voltage which would change the energy level of the electrical discharges, the invention is operative to modify the ON time of the output machining pulses thereby maintaining an approximately constant energy level in the electrical discharges.

4 Claims, 2 Drawing Figures

PATENTED JUL 31 1973 3,749,876

3,749,876

REGULATOR FOR AN EDM POWER SUPPLY

BACKGROUND OF THE INVENTION

Generally, the invention relates to the area of electro-discharge machining (EDM) power supplies; and specifically, the invention provides an improved EDM power supply which automatically maintains a constant energy level in electrical discharges across a machining gap independent of changes in the input or line voltage to the power supply.

Up to this time, the problem of regulation of an EDM power supply has received little attention. Although many supplies operate effectively with no regulation, there may be situations where some regulation is desired. If the power supply experiences continuous and substantial changes in the input or line voltage, the quality of the machining process may be affected. Traditionally, when regulation was required, regulators were designed and incorporated to provide a relatively accurate regulation, e.g. ± 1 percent. However, in the high current power supplies used in the EDM process, the addition of a regulator is very expensive.

In typical power supply applications, the requirement of ± 1 percent regulation is not unusual. However, in an EDM power supply, a high degree of regulation is not required; and the implementation of such a regulation circuit is unnecessarily expensive. In EDM power supplies, for most general applications, a regulation circuit providing a ± 10 percent regulation is sufficient.

Most EDM power supplies produce output machining pulses by using a power switching circuit to switch an output voltage signal from a direct current source in response to low power pulses from an oscillator or pulse source. The output machining pulses generate electrical discharges across the machining gap at some predetermined but selectable energy level. The energy is a function of the product of the amplitude of the machining pulses, the pulse width or ON time of the machining pulses and the magnitude of current flowing through the gap during a discharge. Without regulation, when fluctuations in line voltage occur, the output voltage signal from the DC source is changed accordingly. Consequently, the voltage level of the output machining pulses is changed; and the energy of the electrical discharges also changes. These variations are undetectable by the casual machine operator, and their continued occurrence may be detrimental to the quality of the machining process.

Applicant proposes an apparatus which overcomes the above disadvantages by providing a relatively coarse regulation in the EDM power supply at a very low cost which maintains any variations in metal removal well within tolerable limits.

SUMMARY OF THE INVENTION

Applicant claims an apparatus for use with an EDM power supply of the type generating electrical discharges having a predetermined energy level across a machining gap in response to a predetermined input voltage. The apparatus comprises a means for sensing variations in the input voltage and a further means for modifying the operation of the power supply in response to input voltage variations to maintain the electrical discharges at approximately the predetermined energy level.

DESCRIPTION OF THE PREFERRED EMBODIMENT

Figure 1:
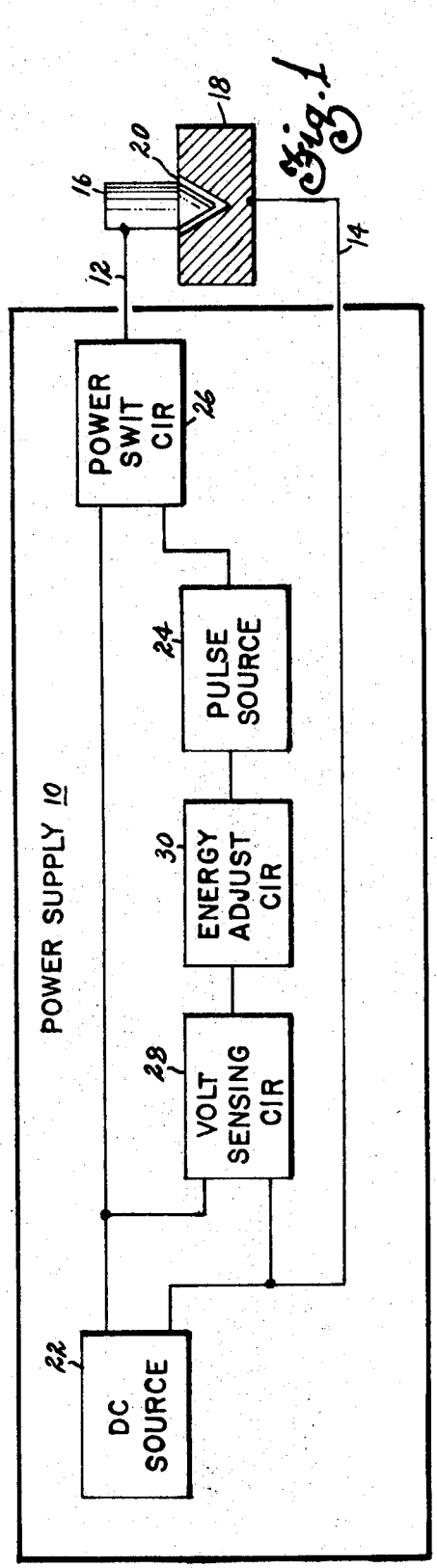
FIG. 1 is a block diagram of applicant's invention.

FIG. 1 is a general block diagram of an EDM power supply including the elements of applicant's invention. A power supply 10 produces output machining voltage pulses on lines 12 and 14 which are connected to an electrically conductive tool 16 and an electrically conductive workpiece 18. The tool 16 and workpiece 18 are positioned to form a machining gap 20 through which, under proper conditions, electrical discharges are passed. The relative position between the tool and workpiece may be controlled by a standard servomechanism (not shown) the design and operation of which is well-known to those who are skilled in the art. Also not illustrated but standard in design and operation is a dielectric flow control. Any standard dielectric flow control may be used when practicing the present invention.

Within the power supply 10, a direct current source 22 is responsive to an external power source (not shown) for producing a relatively large D.C. signal. Under normal conditions, a pulse source 24 produces low power pulses having a pulse duration or ON time and a time duration between pulses or OFF time for controlling the pulse width and repetition of the output machining pulses on the output of the power supply 10. A power switching circuit 26 is responsive to the low power pulses from the pulse source 24 for switching the D.C. signal from the direct current source 22 thereby producing machining pulses on the output of the power supply 10.

Circumstances may occur where the external power source supplying the direct current source 22 experiences severe voltage fluctuations. These fluctuations will be reflected through the direct current source 22, and severe variations will occur in the magnitude of the output machining pulses from the power supply. Consequently, the energy level of the electrical discharges which result from the output machining pulses will change correspondingly. In situations where the fluctuations in the external power source are severe, the rate of metal removal during the machining process will be affected. Further, this situation will cause a distortion between the magnitude of the peak current which has been set on the power supply controls by the operator and the actual peak current magnitude produced by the power supply. This can be a problem in situations where the magnitude of machining current is critical. The above problems are overcome by applicant's invention comprised of a voltage sensing circuit 28 and an energy adjusting circuit 30. The voltage sensing circuit 28 is connected to the output of the direct current source 22 and produces an output signal as a function of variations in the voltage signal from the direct current source. The energy adjusting circuit 30 is responsive to the output signal for producing a control signal as a function thereof. The control signal is operative within the pulse source for changing the ON time of the low power pulses. Since the energy of an electrical discharge is a function of the pulse width or ON time and the voltage magnitude of the output machining pulses, the control signal is operative to change the ON time in a manner inversely proportional to the fluctuations in the voltage magnitude.

Figure 2:
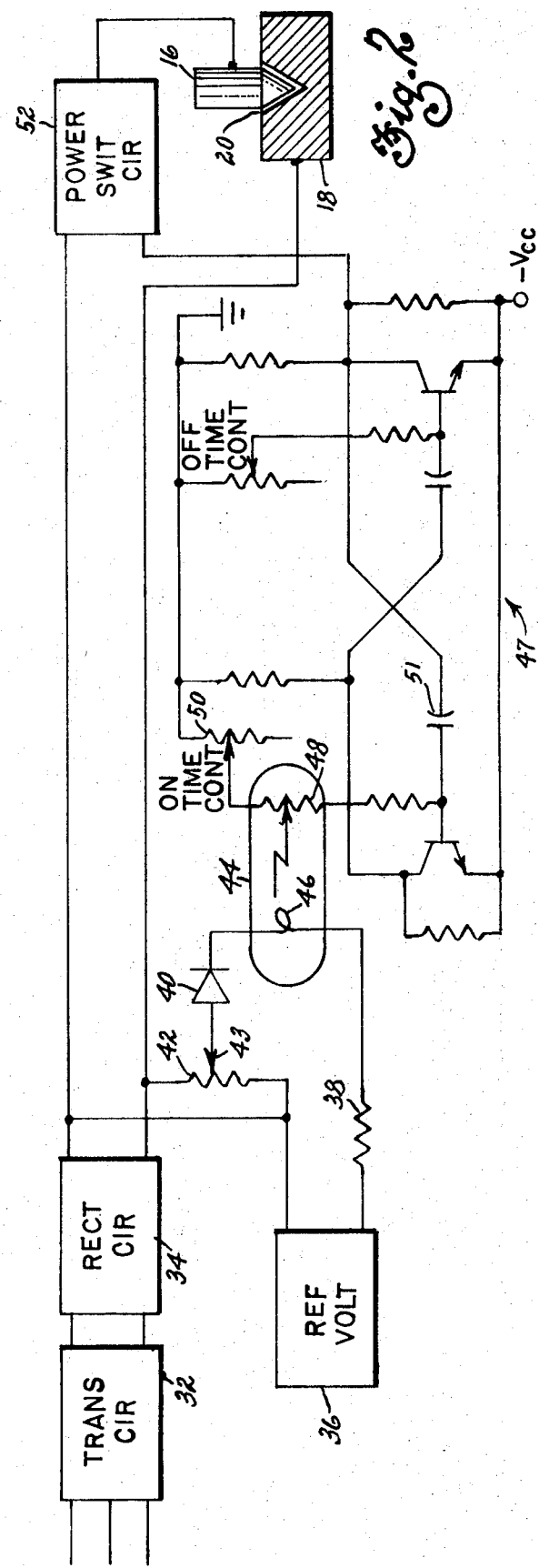
FIG. 2 is a detailed schematic diagram of applicant's apparatus.

FIG. 2 is a detailed schematic diagram illustrating in detail the elements of applicant's invention. A transformer circuit 32 is responsive to an external power source (not shown) for producing a predetermined voltage signal. A rectifier circuit 34 is connected to the transformer circuit 32 and is operative to generate a predetermined D.C. voltage signal. The transformer circuit 32 and the rectifier circuit 34 combine to form a direct current source as described in FIG. 1. A voltage sensing circuit is defined by a reference voltage source 36, a resistor 38, a diode 40 and potentiometer 42. The potentiometer 42 is connected directly across the output of the rectifier circuit 34. Under ideal conditions, the voltage magnitude from the rectifier circuit 34 produces a predetermined current through resistor 42 and a predetermined potential at the point of the wiper arm 43 of the potentiometer 42. Under the above ideal conditions, a D.C. reference voltage from the voltage source 36 is established to generate a predetermined current through the emitter 46 of the photon coupled isolator 44. The photon coupled isolator 44 operates within a multivibrator circuit 47 to provide a means for adjusting the energy of the electrical discharges across the machining gap. The isolator 44 provides electrical isolation between the voltage sensing circuit and the multivibrator 47. The predetermined current which flows through the emitter 46 will generate an emission of photons therefrom. Characteristically, the receiver 48 of the isolator 44 has a unique resistance corresponding to the photon emission. The multivibrator 47 is designed to accomodate the resistance of the receiver 48. Consequently, under normal conditions the multivibrator 47 operates in a standard manner and produces low power pulses to the power switching circuits 52. The power switching circuits 52 switch the D.C. voltage signal from the rectifier circuit 34 in response to the low power pulses, and produces output machining pulses across the machining gap 20.

Under circumstances where the external power source contains substantial voltage fluctuations, and further when such fluctuations are typically in the direction reducing the magnitude of the voltage signal from the rectifier circuit 34, the current through resistor 42 experiences a similar reduction. Consequently, the voltage level at the wiper arm 43 is reduced thereby reducing the potential difference between the wiper arm 43 and the reference voltage source 36. This, in turn, decreases the magnitude of the current through resistor 38 and the emitter 46 of the isolator 44. By decreasing the current through the emitter 46, the emission of photons is also decreased; and the resistance of the receiver 48 is increased as a function of the photon emissions. The resistance of the receiver 48 is coupled to a wiper arm of a potentiometer 50 which controls the ON time of the multivibrator 47. The increased receiver resistance reduces the current flow to the capacitor 51; and hence, the charging time of the capacitor 51 is increased.

Therefore, the ON time of the multivibrator 47 is increased as a function of the increase in the resistance of the receiver 48.

To summarize the operation, during a discharge, voltage fluctuations in the external power source may cause a decrease in the energy level of the electrical charges across the machining gap 20. These fluctuations are sensed by the resistor 42 and a decrease in current through the emitter 46 results in an increase in resistance of the receiver 48. The higher receiver resistance increases the ON time of the low power pulses from the multivibrator 47; and consequently, the ON time of the output machining pulses from the power switching circuits 52 is alsl increased. Therefore, the energy in the discharge is increased via the ON time as a function of a corresponding decrease produced by a voltage reduction in the external power source. In a similar manner, if a voltage fluctuation in the external power source is in a direction to cause an increase in the energy of a discharge, applicant's circuit will respond by decreasing the ON time of the output machining pulses, and thereby maintain an approximately constant energy level.

While the invention has been illustrated in some detail according to the preferred embodiments shown in the accompanying drawings, and while the preferred illustrated embodiments have been described in detail, there is no intention to limit the invention to such details. On the contrary, it is intended to cover all modifications, alterations and equivalents falling within the spirit and scope of the appended claims.

What is claimed is:

1. An EDM power supply of the type comprised in part of a power switching circuit for switching a voltage signal from a D.C. source in response to low power pulses from a pulse source to produce output machining pulses, said output machining pulses generating electrical discharges having a predetermined energy level across a machining gap, wherein the improvement comprises:
   a. means responsive to the voltage signal for sensing changes in the voltage signal and producing a control signal as a function thereof; and
   b. means connected between the sensing means and the pulse source for changing the output machining pulses as a function of the control signal to maintain an approximately constant energy level.

2. A EDM power supply of the type comprised in part of a power switching circuit for switching a voltage signal from a D.C. source in response to low power pulses having a predetermined ON time from a pulse source to produce output machining pulses, said output machining pulses generating electrical discharges having a predetermined energy level across a machining gap, wherein the improvement comprises:
   a. means responsive to the voltage signal for sensing changes in said voltage signal and producing a control signal as a function thereof; and
   b. means connected between the sensing means and the pulse source for changing the ON time of the low power pulses in response to the control signal to maintain an approximately constant energy level in the electrical discharges.

3. An EDM power supply of the type comprised in part of a power switching circuit for switching a voltage signal from a D.C. source in response to low power pulses from a pulse source to produce output machining pulses, said output machining pulses generating electrical discharges having a predetermined energy level across a machining gap, wherein the improvement comprises:

a. means connected to the D.C. source for sensing changes in the voltage signal causing changes in the energy level of the electrical discharges; and
b. means connected between the sensing means and the pulse source for changing the low power pulses as a function of the changes in the voltage signal to maintain the electrical discharges at approximately the predetermined energy level.

4. An EDM power supply of the type comprised in part of a power switching circuit for switching a voltage signal from a D.C. source in response to low power pulses from a pulse source to produce output machining pulses, said output machining pulses generating electrical discharges having a predetermined energy level, wherein the improvement comprises:

a. means connected to the D.C. source for producing a control signal as a function of variations in the voltage signal; and
b. means connected between the producing means and the pulse source but electrically isolated from the voltage signal for changing the ON time of the low power pulses as an inverse function of the changes in the voltage signal.

* * * * *